United States Patent [19]
Harder, Jr.

[11] 3,784,147
[45] Jan. 8, 1974

[54] SEAT ADJUSTING MECHANISM
[75] Inventor: Arthur J. Harder, Jr., Franklin Park, Ill.
[73] Assignee: Coach and Car Equipment Corporation, Elk Grove Village, Ill.
[22] Filed: Feb. 11, 1972
[21] Appl. No.: 225,474

[52] U.S. Cl............... 248/371, 248/421, 297/313, 297/337
[51] Int. Cl............................................. A47c 3/00
[58] Field of Search.......................... 297/337, 313; 248/421, 422, 419, 371, 384

[56] References Cited
UNITED STATES PATENTS
| | | | |
|---|---|---|---|
| 2,310,346 | 2/1943 | Bell | 248/419 X |
| 3,075,736 | 1/1963 | Freedman | 248/419 X |
| 2,260,032 | 10/1941 | Kaiser | 248/419 X |
| 459,312 | 9/1891 | Sauer | 297/313 X |
| 2,646,839 | 7/1953 | Hillman | 297/313 |
| 3,189,312 | 6/1965 | Bilancia | 248/421 X |

FOREIGN PATENTS OR APPLICATIONS
554,671   7/1943   Great Britain ................ 248/421

Primary Examiner—Francis K. Zugel
Attorney—Charles J. Merriam et al.

[57] ABSTRACT

Vehicle seat is mounted on an assembly which moves seat vertically to a selected elevation corresponding to a setting on a polygonal plate without significant horizontal movement of the seat or plate. Vertical position of rearward portion of seat is adjusted by operation of a support means actuable by a seat occupant leaning forward and lifting said rear portion of the seat.

3 Claims, 8 Drawing Figures

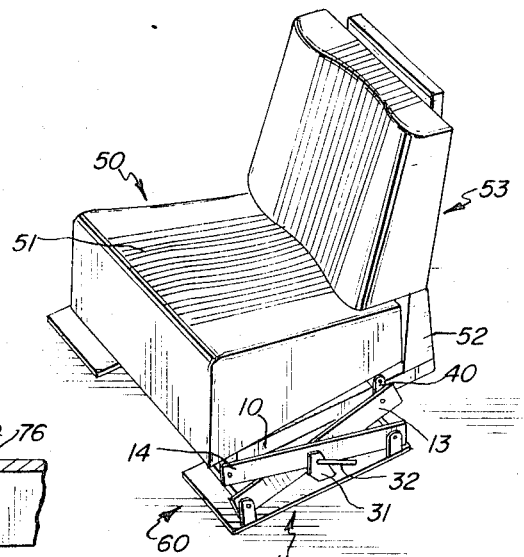
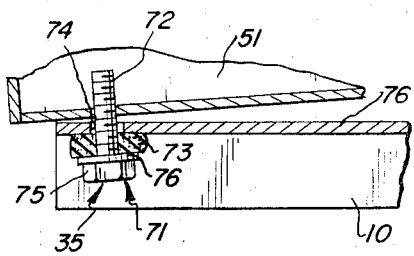
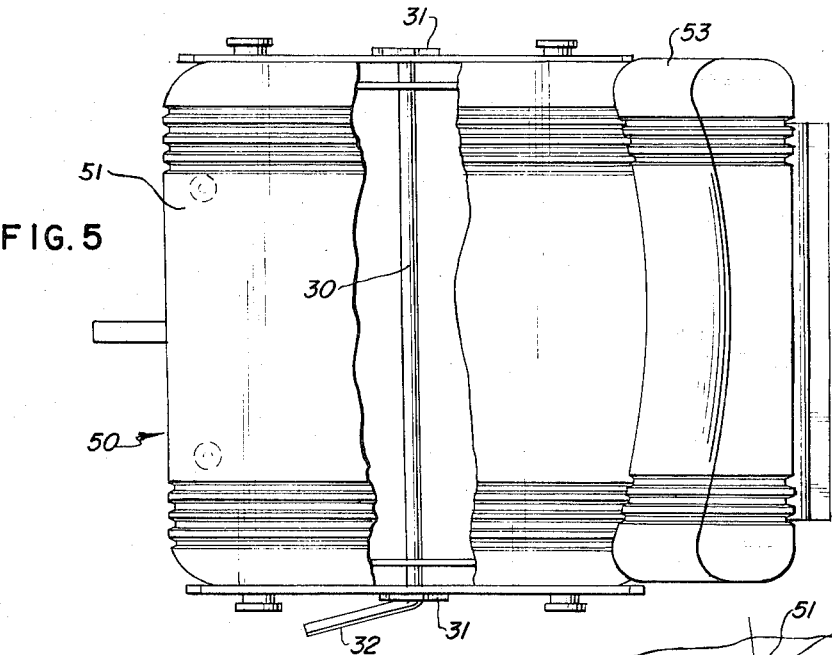
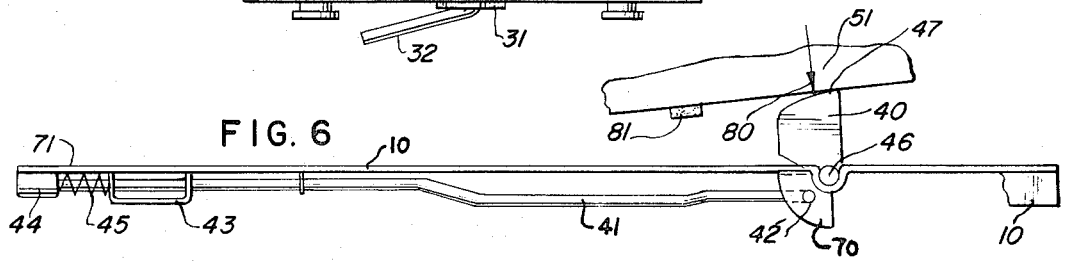
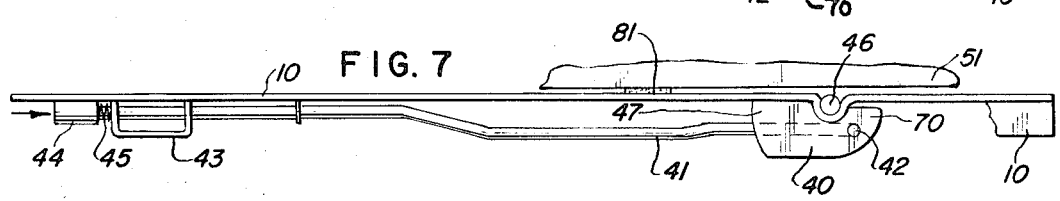

3,784,147

SEAT ADJUSTING MECHANISM

BACKGROUND OF THE INVENTION

The present invention relates generally to a seat adjusting mechanism, and more particularly to a heavy-duty seat adjusting mechanism which allows elevational or vertical adjustment of the seat without attendant horizontal movement found in conventional seat adjusting mechanisms. In addition, the seat adjusting mechanism of the present invention is economical to manufacture, simple in its operation and not adversely affected by exposure to dust, dirt, grime and to the weather.

Typical vehicles utilizing seat adjusting mechanisms constructed in accordance with the present invention include heavy construction equipment, off-the-road vehicles, earth-moving machinery and the like.

SUMMARY OF THE INVENTION

A seat adjusting mechanism constructed in accordance with the present invention enables the following adjustments to be performed:

1. Vertical adjustment without substantial fore and aft movement.
2. Vertical adjustment of the rear portion of the seat cushion with respect to the forward portion thereof.

The seat adjusting mechanism incorporates structure, to be subsequently described in detail, which is rugged in construction in that all moving and load-bearing parts may be manufactured of heavy-duty materials, thereby significantly reducing the need for servicing and rendering the adjusting mechanism relatively immune from the adverse effects of dust, dirt, grime and the weather. Likewise, in operation, all vertical seat adjustments are accomplished in a simple manner without any significant horizontal movement of the seat or adjusting mechanism. This allows the vehicle operator to adjust his elevation without affecting his distance to the various stationary controls and the like in the vehicle. Likewise, due to the lack of significant movement of the adjusting mechanism, it requires only a small area for operation.

Other features and advantages are inherent in the structure claimed and disclosed or will become apparent to those skilled in the art form the following detailed description in conjunction with the accompanying drawings.

BRIEF DESCRIPTION OF THE DRAWINGS

FIG. 4 is a perspective of the seat;

FIG. 5 is a plan view of the seat with the seat cushion partially cut away;

FIG. 6 is a fragmentary side elevational view illustrating a portion of the seat cushion adjusting mechanism in an operative position;

FIG. 7 is a fragmentary side elevational view, similar to FIG. 6, illustrating a portion of the seat cushion adjusting mechanism in an inoperative position; and FIG. 8 is a fragmentary side elevational view illustrating a flexible coupling of the seat cushion adjusting mechanism.

DESCRIPTION OF THE PREFERRED EMBODIMENT

Figure 1:
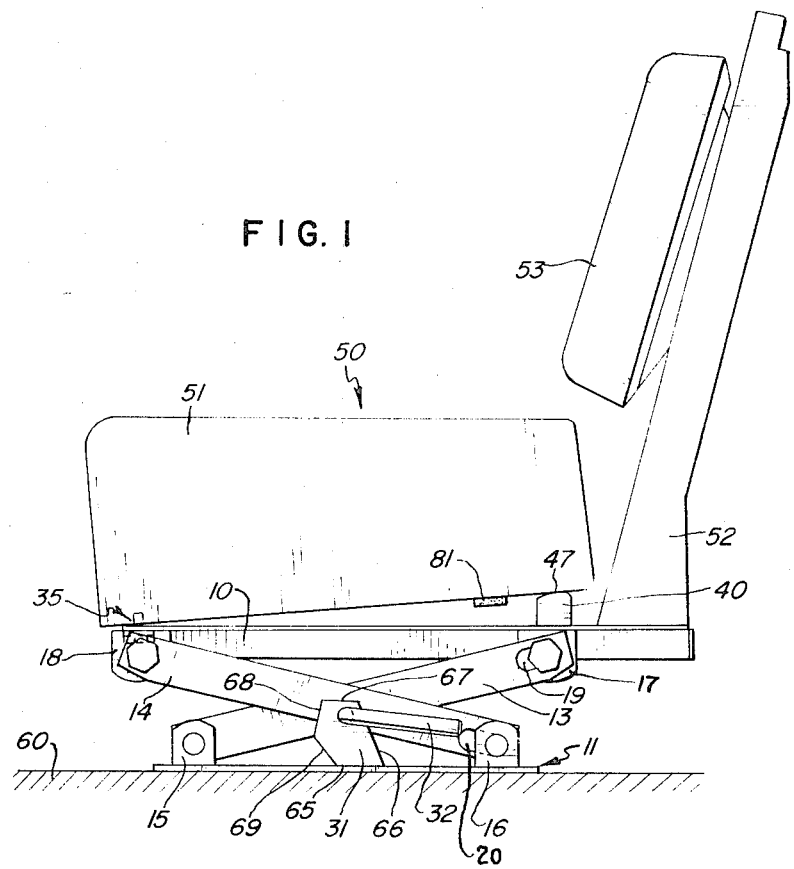
FIG. 1 is a side elevational view of a vehicle seat constructed in accordance with an embodiment of the present invention.

Referring initially to FIGS. 1–5, there is illustrated an embodiment of an adjustable seat, indicated generally at 50, and having a seat adjusting mechanism constructed in accordance with the present invention. Vehicle seat 50 includes a base portion, indicated generally at 11, mounted on a vehicle floor 60. A horizontally disposed seat cushion supporting frame 10 is spaced vertically above and is mounted for vertical movement relative to base 11 by a pair of horizontally spaced scissors suspensions each having two crossing levers 13, 14. An occupant-accomodating means, such as a seat cushion 51, is normally supported atop and connected to frame 10. Attached to the rear portion of frame 10 are a pair of brackets 52 which mount a vertically disposed back rest 53.

One end of each scissors lever 13, 14 is pivotally mounted to base 11 at flanges 15, 16 respectively. The other end of each scissors lever 13, 14 is pivotally mounted to seat frame 10 at flanges 17, 18 respectively. Slots 19, 20 are formed at the rearward ends of levers 13, 14 to permit the necessary longitudinal movement of the levers with respect to flanges 16, 17 when adjusting the elevation of seat frame 10.

A rod 30 extends through and is rotatably mounted on both pairs of levers 13, 14 at their locus of intersection.

A pair of polygonal plates 31, having sides 65–69, are fixedly mounted at each end of rod 30 at a location on the plates offset from their axial center. Plates 31 rotate with rod 30. At any given time, one of the several sides of plates 31 rests on base 11. The distance from the axis of rod 30 to a side of plates 31 varies for each side of the plates; and the distance from rod 30 to base 11 depends upon which side of the plates has been rotated to a resting position on base 11.

Extending radially from an end of rod 30 is a handle 32 which can be manually pivoted about the axis of the rod by the vehicle operator. When handle 32 is moved, rod 30 rotates with plate 31 and a different side of the plate comes to rest on base 11. The handle 32 can be moved to any one of several different positions, each corresponding to a different side of plate 31 resting on base 11.

The elevation of seat cushion supporting frame 10 relative to base 11 can be varied among any one of several different elevations, in increasing or decreasing succession, by moving handle 32 to change the side of plate 31 which rests on base 11. As the side plate 31 which rests on base 11 is changed, the rod 30 moves up or down, depending upon the position to which handle 32 is moved, causing scissors levers 13, 14 to move either together or apart, thereby lowering or raising seat cushion supporting frame 10 relative to base 11.

Figure 2:
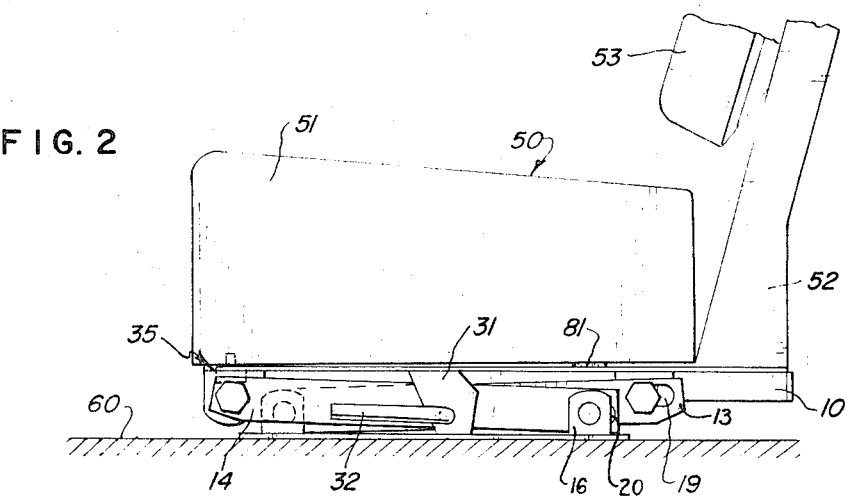
FIG. 2 is a fragmentary side elevational view, similar to FIG. 1, illustrating portions of the seat in different positions than in FIG. 1.
Figure 3:
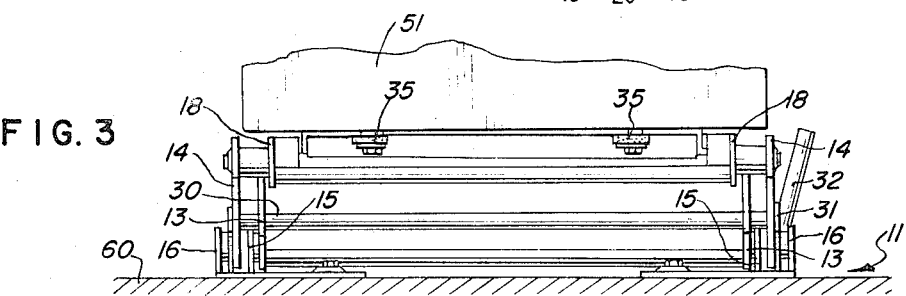
FIG. 3 is a front view of the seat.

Due to the utilization of scissors levers 13, 14 in the present invention to elevate the seat cushion supporting frame 10, there is no significant horizontal movement of frame 10 or plate 31 as the vehicle seat is adjusted from its various positions between the vertically raised position illustrated in FIG. 1 and its lowest position illustrated in FIG. 2. For example, seat adjusting mechanisms constructed according to the present invention allow less than three-eights inch horizontal movement of frame 10 for every 3 inches of vertical movement. In addition, due to the corresponding lack of significant horizontal movement of plate 31 in operation, each side of plate 31 rests upon approximately the same area of base 11 as the elevation of frame 10 is varied among any one of the several different elevations.

The above-described structure and its movement allows elevational or vertical adjustment of seat frame 10 and cushion 51 without significant horizontal movement of the seat or the adjusting mechanism, and it is not adversely affected by dust, dirt, grime or weather, as would be the case with structure composed of members mounted for slidable movement as contrasted to the scissors movement of the present invention. Likewise, due to the simplicity of construction of the above-described structure, it is possible to utilize heavy-duty materials in the manufacture of each of its parts, thereby significantly reducing the need for servicing in the field.

FIGS. 1, 2, 6–8 illustrate structure for adjusting the vertical position of the rearward portion of seat cushion 51. Referring to FIGS. 1 and 2, seat cushion 51 is pivotally mounted, adjacent the bottom front edge thereof, to seat cushion frame 10 by a pair of flexible couplings 35 which allow limited vertical pivoting of seat cushion 51 with respect to seat frame 10. As illustrated in FIG. 8, flexible coupling 35 comprises bolt 71, having a shank 72 extending through a flat steel washer 76 and a resilient compression washer 73 into a hole 74 in frame 10. Bolt shank 72 is rigidly attached at its end to seat cushion 51. Compression washer 73 is located about bolt shank 72 and between bolt head 75 and flange 76 of frame 10. In operation, when seat cushion 51 is pivoted vertically with respect to frame 10, bolt shank 72 correspondingly tilts within hole 74, the diameter of hole 74 being larger than the diameter of bolt shank 72 in order to allow for the tilting. As bolt shank 72 tilts within hole 74, bolt head 75 compresses washer 73 between the bolt head and flange 76 of frame 10, thereby accommodating the necessary vertical movement of seat cushion 51 with respect to frame 10 when the rearward portion of said seat cushion is adjusted to its vertically raised position.

Pivotally mounted on seat frame 10, beneath the rear portion of seat cushion 51, is a support element such as cam member 40. Cam member 40 may be pivoted between an operative or vertical position as illustrated by FIGS. 1 and 6, and an inoperative or horizontal position as illustrated by FIGS. 2 and 7.

The pivoting of cam member 40 is accomplished by means of a rod 41 having a back end pivotally attached at 42 to a rear or bottom portion 70 of cam member 40. Rod 41 extends frontwardly beneath seat cushion 51, adjacent frame 10, through a rod support bracket 43 depending downwardly from seat frame 10. A depressible button 44, located beneath the front portion of seat frame 10, is attached to the front end of rod 41. A coil spring 45 is mounted around rod 41 between button 44 and bracket 43. Coil spring 45 normally urges button 44 frontwardly, and this forward force is transmitted through rod 41 to urge cam member 40 to pivot about its axis 46 in an upward direction. However, the weight of seat cushion 51 is greater than the urging force of spring 45 so that cam member 40 is normally held in an inoperative or horizontally pivoted position by the weight of the seat cushion, as is illustrated by FIGS. 2 and 7.

To vertically raise the rear portion of seat cushion 51, the seat occupant leans forward and rests his weight partially on his feet and partially on the front portion of the seat cushion. He then reaches behind the rear portion of the seat cushion 51 and lifts it upwardly to remove the weight of the seat cushion from the cam member 40. This permits spring 45 to urge cam member 40 into its vertical or operative position.

When the seat occupant releases the rear portion of seat cushion 51, the bottom thereof rests on a top part 47 of cam member 40, thereby supporting the rear portion of the seat cushion in a vertically raised position higher than the forward portion of seat cushion 51, as illustrated by FIGS. 1 and 6.

The weight of seat cushion 51 is directed downward as a vector force (arrow 80 in FIG. 6) upon cam top part 47. The direction of vector force 80 extends through the pivotal axis 46 of the cam member, or to the rear thereof. As a result, the entire weight of raised seat cushion 51 is directed through cam member axis 46, or to the rear thereof, and the weight of the seat cushion does not act against the force of spring 45 which maintains the cam member in its operative position. The seat cushion thereby remains in its vertically raised position until returned to its lowered position as described below.

To return the seat cushion 51 from its vertically raised position atop cam member 40 to its lowered position resting upon seat cushion frame 10, the occupant presses button 44 against spring 45. The depression of button 44 overcomes the forward urging of spring 45 and provides a rearward force transmitted through rod 41 to bottom portion 70 of cam member 40, thereby urging cam member 40 to pivot downwardly to its inoperative position. As shown in FIG. 6, the center of gravity of cam member 40 is located forwardly of its pivotal axis 46 when the cam member is in its operative position, and this also urges the cam member to its inoperative position. When the cam member pivots downwardly, the rear portion of seat cushion 51 drops to its vertically lowered position resting upon frame 10, as illustrated by FIGS. 2 and 7. A resilient bumper 81 (FIG. 1) attached to the bottom of seat cushion 51 absorbs the shock of the drop and rests atop frame 10.

Once cam member 40 is in its horizontal or inoperative position, it is maintained there by the weight of seat cushion 51 which is greater than the upwardly urging force of spring 45 upon the cam member.

The foregoing detailed description has been given for clearness of understanding only, and no unnecessary limitations should be understood therefrom, as modifications will be obvious to those skilled in the art.

What is claimed is:

1. In an adjustable vehicle seat;
   a seat frame;
   a seat cushion having a forward portion and a rear portion;
   means mounting said seat cushion for movement, relative to said seat frame, between a first position in which said rear portion of the seat cushion is at substantially the same elevation as said forward portion and a second position in which said rear portion is higher than said forward portion;
   a cam member;

means pivotally mounting said cam member on said seat frame for movement of the cam member, about a pivotal axis, between an operative position for maintaining the seat cushion in its second position and an inoperative position in which the seat cushion is in its first position;

means, responsive to a seat occupant leaning forward and lifting the rear portion of said seat cushion, for moving said cam member from its inoperative to its operative position;

the center of gravity of said cam member being located forwardly of its pivotal axis when the cam member is in its operative position, to urge the cam member toward its inoperative position;

and means on said cam member for engaging the bottom of said seat cushion rearwardly of the front portion thereof, when the cam member is in its operative position, so that the vector force of the weight of said seat cushion is directed downwardly upon said cam member, and no further forwardly than through said pivotal axis of the cam member, to maintain said cam member in said operative position, against the urging of its center of gravity, when the cam member is in said engagement with said seat cushion.

2. In an adjustable vehicle seat as recited in claim 1 wherein said means for moving the cam member comprises:

a rod having one end attached to said cam member and extending forwardly therefrom;

means on said seat frame mounting said rod for movement in forward and rearward directions;

and spring means for transmitting a forward force through said rod to urge said cam member toward its operative position.

3. In an adjustable vehicle seat as recited in claim 1:

depressible button means for moving said cam member from its operative to its inoperative position.

* * * * *